Patented June 9, 1942

2,285,486

UNITED STATES PATENT OFFICE 2,285,486

PREPARATION OF TITANIUM DIOXIDE PIGMENTS

Jelks Barksdale, New York, N. Y., and Walter W. Plechner, Metuchen, N. J., assignors to National Lead Company, New York, N. Y., a corporation of New Jersey No Drawing. Application June 18, 1940, Serial No. 341,142

12 Claims. (Cl. 23—202)

The present invention relates to the preparation of titanium dioxide pigments by methods which include the hydrolytic precipitation of hydrous titanium oxide from hydrolyzable titanium salt solutions. It has particular reference to hydrolysis methods which include the use of so-called "nuclei" or "nuclear compositions."

The primary objects of the invention include: (1) improved methods for the preparation of pigmentary titanium dioxide possessing high tinting strength, good color, and high brightness; (2) improved methods for the hydrolysis of hydrolyzable titanium salt solutions, and (3) methods for the preparation of novel nuclear compositions.

In our copending application, Serial No. 238,542, filed November 3, 1938, there is described methods for the preparation of nuclear compositions from titanium tetrachloride solutions and the use thereof in the hydrolysis of hydrolyzable titanium salt solutions. According to that application the nuclear compositions are obtained by neutralizing an amount of the hydrochloric acid combined as titanium tetrachloride substantially equivalent to one of the four chlorine atoms of a titanium tetrachloride solution, after which the partially neutralized solution is diluted to a predetermined titanium content and heat-treated to develop its nucleating properties. The present invention is related to, but is distinct from, our copending application.

According to the present invention, and in its broadest aspects, salts which yield monobasic anions are added to a titanium tetrachloride solution, the resulting solution is heat-treated to develop its nucleating properties and is then ready for use in the hydrolysis of titanium salt solutions.

The efficiency of the nucleating compositions and the quality of the titanium dioxide pigment obtained from the practice of the present invention depend upon certain factors, as follows:

I. Concentration of titanium in the titanium tetrachloride solution from which the nuclear composition is prepared.

II. Amount and type of monobasic anion yielding salt present in the nucleating composition.

III. Temperature and time of heat-treating the nucleating composition.

IV. Manner of mixing the heat-treated nuclear composition with the hydrolyzable titanium salt solution.

V. Concentration of titanium in the hydrolysis mixture of nuclear composition and titanium salt solution.

VI. Basicity, i. e., ratio of titanium to acid in the hydrolysis mixture of titanium salt solution and nuclear composition.

VII. Quantity of nuclear composition to be employed in the hydrolysis of the titanium salt solution.

These factors will now be explained so as to enable those skilled in this art to better comprehend our invention.

I. CONCENTRATION OF TITANIUM IN THE TITANIUM TETRACHLORIDE SOLUTION

In the present invention the concentration of the titanium tetrachloride solution prior to the introduction of the salt which yields the monovalent anion is not of primary importance with respect to the preparation of the nuclear composition. For most practical purposes the titanium tetrachloride solution should contain between about 250 grams and about 400 grams titanium dioxide equivalent per liter. In accordance with usage in the art, the concentrations of titanium solutions are expressed as grams per liter, or per cent as the case may be, of titanium dioxide to indicate the titanium concentration, and of hydrochloric acid or of sulfuric acid to indicate the concentration of the acid radical.

The acid concentration is, of course, both free acid and that combined with the titanium to form the titanium salt in solution. To obtain such a solution the ordinary anhydrous titanium tetrachloride of commerce will serve as a starting material. For instance, a known weight may be slowly poured into water, exercising care that the temperature is held below about 70° C., preferably about 40° C., in order to avoid precipitation of titanium compounds due to thermal hydrolysis occasioned by the heat of dilution. Following this procedure, solutions may be obtained which contain about 250 grams to about 400 grams per liter of titanium, calculated as $TiO_2$, the preferred range being 325–375 grams per liter. It may be found at times that the solution will contain somewhat less hydrochloric acid than would be expected from the theoretical composition, $TiCl_4$. The solution to be prepared for hydrolysis may be treated with a reducing agent, e. g., zinc dust, in order to reduce any oxidizable impurities which may be present in the solution. The reducing treatment should preferably be carried out until the solution has a faint purplish color, indicating that a small amount of titanium of the order of 1 to 3 grams per liter, calculated as titanium dioxide, $TiO_2$, has been converted to the trivalent state in order to prevent these oxidizable impurities from re-oxidizing during subsequent stages in the process and thus becoming harmful. Thereafter, if necessary, the solution may be filtered to remove any solids present either as impurities or those resulting from the dilution. This solution then is suitable for use as the hydrolysis solution. It also is suitable for the preparation of the nuclear compositions of the present invention, i. e., the monovalent anion yielding salt may be dissolved therein, the resulting solution diluted, heat-treated, and then utilized as a nuclear composition for the hydrolysis of titanium chloride or sulfate solutions as is fully described herein.

II. AMOUNT AND TYPE OF MONOVALENT ANION YIELDING SALT PRESENT IN THE TITANIUM TETRACHLORIDE SOLUTION IN THE PREPARATION OF NUCLEAR COMPOSITIONS

The amount of monovalent anion yielding salt to be added to the titanium tetrachloride solution according to this invention may conveniently be expressed as chlorine atom equivalents per mol of titanium tetrachloride present in the solution. That is to say, if for each molecule of $TiCl_4$ one molecule of a metal salt yielding monovalent anions upon ionization, e. g., sodium chloride, is added, then the ratio of chlorine ion which may be derived from the added salt to the chlorine ions derived from the titanium tetrachloride is as 1:4, i. e., ratio of added Cl to $TiCl_4$ equals 1.0 to 1.0; the same ratio is obtained with one-half molecule of calcium chloride, $CaCl_2$, and one-third molecule of aluminum chloride, $AlCl_3$.

It has been found according to this invention that the best results, i. e., titanium dioxide pigment possessing the optimum tinting strength and best color, as well as the highest nucleating efficiency, are obtained when a sufficient amount of salt is added to the titanium tetrachloride solution, which is to be converted to a nuclear composition, to give a ratio of from about 0.5 to about 2.0 mols of monovalent anions to one mol of titanium tetrachloride.

The resulting solution will, in contradistinction to the nucleating compositions described in our copending application Serial No. 238,542, where about one-fourth of the hydrochloric acid in solution is neutralized by alkali, still contain the original ratio of 4HCl to $1TiO_2$; that is, the ratio of a normal titanium tetrachloride solution as it is formed by diluting titanium tetrachloride, and deviates from such solution in that it will also contain in solution added monovalent anion yielding salt or salts. Furthermore, it differs from a normal titanium tetrachloride solution in respect to stability in that it has been found that when a salt-treated titanium tetrachloride solution has been heat-treated according to this invention in a manner to be described, the resulting nuclear composition is more stable; that is, it exhibits less tendency to precipitate titanium compounds on standing than a similar titanium tetrachloride solution which does not contain any added salt. The salt-treated solutions of this invention remain clear for a long period of time on standing, whereas a titanium tetrachloride solution of the same titanium concentration to which no salt has been added tends to precipitate titanium compounds out of solution during or within a short period of time after the heat treatment. We are not able to furnish any well founded explanation of why the salt addition should in effect produce a greater stability, unless complexes or double salts are formed in the solution between the titanium compounds and the added salt, which complexes are more stable than the titanium complexes themselves.

The composition of the monovalent anion yielding salt as well as the amount of salt added to the titanium solution from which the nuclear composition is formed is of great importance. Thus, it has been found that the nitrates of, for example, sodium and calcium, produced off colored pigments which also had a somewhat low tinting strength. The low brightness and tinting strength of these pigments are in our estimation due to the oxidizing effect of the nitrates which, first in the nuclear composition and then in the solution to be hydrolyzed oxidize all the trivalent titanium and the iron together with other impurities which, as a consequence thereof, are adsorbed by the nuclei and by the precipitate in the course of the hydrolysis. While the importance of the type of anion selected for the salt addition to the nucleating composition is evident from the aforesaid, the type of cation introduced with the anion appears to be of little consequence. We have found that the best results are obtained by using such salts as sodium chloride, NaCl; calcium chloride, $CaCl_2$; aluminum chloride, $AlCl_3$; sodium tetraborate, $Na_2B_4O_7 \cdot 10H_2O$ (borax); sodium acetate, $$(Na(C_2H_3O_2)) \cdot 3H_2O$$

in particular, it has been found that borax is especially useful in promoting extremely high tinting strength and brightness in the titanium dioxide products. While it has been found that the advantages of the invention are secured when using any salt of a monobasic acid, either organic or inorganic, which is soluble in a titanium tetrachloride solution and which is without oxidizing effect on any reduced titanium contained therein, the salts just mentioned, because of their availability, low cost, and efficiency, are especially suitable.

In dilute solutions sodium tetraborate ionizes to give the monovalent metaborate anion according to the equation:

$$Na_2^+B_4O_7^- + H_2O \rightarrow 2Na^+ + 4BO_2^- + 2H^+$$

Electrical conductivity and other measurements have demonstrated the abnormality of aqueous solutions of sodium tetraborate and the present invention presents an additional line of proof that monovalent anions are formed by ionization of this compound.

It is essential in the practice of the invention that the salt to be added to the titanium tetrachloride solution be one which yields monovalent anions. Salts which yield polyvalent anions are ineffective. In the first place, they tend to precipitate the titanium when the solution of the salt in the titanium tetrachloride is heat-treated to develop nucleating properties. In the second place, if such a heat-treated solution containing a salt having a polyvalent anion be used as a nuclear composition in the hydrolysis of a titanium salt solution the resulting hydrous titanium oxide will have, after calcination, a tinting strength only from one-third to one-half that of the products obtained when using salts which yield monovalent anions.

No special precaution as to temperature or manner of mixing the monovalent anion yielding salt with the titanium tetrachloride solution need be observed, but the salt in the form of an aqueous solution or in the form of a powder may be added to the tetrachloride solution.

III. TEMPERATURE AND TIME OF THE HEAT-TREATMENT OF THE MONOVALENT ANION YIELDING SALT CONTAINING NUCLEAR COMPOSITION

After the addition of the monovalent anion yielding salt to the titanium tetrachloride solution as described above a reducing treatment and, if necessary, a filtration may follow to remove any possible suspended material. The solution may be diluted, before or after filtration, to a concentration of titanium between about 5 grams and 30 grams $TiO_2$ per liter and is ready for heat-treatment.

Since the nucleating efficiency as well as the tinting strength and color of titanium dioxide pigments obtained from processes embodying the present invention are to a large extent dependent upon the heat-treatment this step is of great importance. Preferably the salt-treated solution should be treated between about 80° to about 90° C. for about 10 minutes to 15 minutes. For the best results the solution is gradually raised to such temperature taking about 15 minutes to do so. Time and temperature are to a certain extent reciprocal and it has been found that nuclear compositions possessing good properties are obtained when heating for a longer period of time at a lower temperature; for example, at 70° to 75° C. for one hour.

During the heat-treatment it will be observed that the appearance of the nucleating composition changes. From the clear, transparency associated with crystalloid solutions it gradually becomes opalescent and the degree of opalescence furnishes a means for gauging the duration and temperature of the heat-treatment. Nuclear compositions should be heat-treated according to the present invention until a degree of opalescence is developed of about the same intensity as that obtained in a heat-treatment at from about 80° C. to about 90° C. for about 10 to about 15 minutes of a solution containing 15 g. p. l. $TiO_2$ and the same amount and type of monovalent anion yielding salt. Opalescence can conveniently be measured by means of a Jackson turbidimeter, as described in Industrial & Engineering Chemistry, vol. 3, page 553, year 1911, the use of which is prevalent in this art. It is to be noted that nuclear compositions of the present invention while giving optimum results as to nucleating efficiency and quality of pigment produced may show different degrees of opalescence when different monovalent anion yielding salts are employed. Therefore, when using the degree of opalescence as an indicia of the temperature and time of heat-treating, the standard of comparison should be a nuclear composition containing the same monovalent anion yielding salt as the one under consideration. In this description of the present invention and in the claims appended hereto the terms "opalescence" and "turbidity" are used synonymously and interchangeably.

The intensity of the heat-treatment may also be gauged by testing for the degree of colloidality developed, for instance, as follows: A quantity of the heat-treated solution is mixed with an equal volume of concentrated hydrochloric acid whereby the colloidal titanium resulting from the heat-treatment is coagulated and precipitated. The precipitate is then filtered, calcined and weighed. The heat-treatment should be such as to yield an amount of precipitate about equal to that obtained from a heat-treatment of a nuclear composition of similar composition at from about 80° C. to about 90° C. for about 10 minutes to about 15 minutes.

It has also been found that the tinting strength and color of the products obtained according to the invention may vary somewhat depending upon the chemical composition of the monovalent anion yielding salt employed. By varying the quantity of the salt used and controlling the time and/or temperature of the heat-treatment according to the invention in order to obtain the optimum turbidity, i. e., the turbidity indicative of maximum nucleating effect to produce products having the highest tinting strength and best color, the variations due to the chemical composition of the salt used may be regulated.

We cannot state definitely the constitution of the nuclear composition in terms of physical chemistry, but we believe its composition results from progressive changes of state from that condition in which the titanium was present in the original solution of titanium tetrachloride. That is to say, in such solutions as are employed in the present invention the titanium tetrachloride is to be regarded as in a crystalloidal solution. The addition of the monovalent ion yielding salts to the titanium tetrachloride solution does not change the titanium compounds in solution from crystalloid condition but does in all probability effect the metastable equilibrium of the solution and will therefore influence the transition of the crystalloid condition of the titanium complexes to the colloidal state which occurs during the heat-treatment or so-called "curing period" during which the titanium complexes in solution grow larger by olation and oxolation (phenomenon associated with thermal hydrolysis), the heat-treatment being discontinued before olation and oxolation has proceeded to an extent that precipitation does occur, the titanium complexes remaining partially in the crystalloidal and partially in the colloidal state or intermediate between what might be recognized as strictly crystalloid or colloid conditions. The heat treatment causes further physico-chemical changes of the titanium complexes to occur. These changes may also be regarded as olation and oxolation, whereby the size of the titanium complex becomes larger with accompanying loss of the molecules present as aquo groups. The nuclear composition may be regarded as consisting of Werner complexes in which the titanium in the cation is associated possibly by physical or chemical bonds of association or both, with hydroxyl and aquo and possibly also with one or more chlorine anions. We believe this state to be evidenced by the degree of opalescence which is produced in the heat treatment. When this state has been reached the titanium complexes, while still dispersed, cannot be separated from the liquid except by the usual involved methods employed to separate colloid particles from liquid, e. g., dialysis. They cannot be removed by ordinary means such as filtration and consequently are not definite, macroscopic particles, which for example, may be removed from the liquid by filtration and washed.

By the term titanium complex as herein employed is meant the micelle which is produced as a result of the change from relatively unassociated crystalloidal condition. Its composition cannot be stated exactly. In all probability it consists of a complex micellar arrangement where titanium constitutes a nuclear cation associated with anions which may be either chlorine or hydroxyl groups as well as with aquo (water) groups, bound by physical as well as chemical bonds of association. A clear picture of such complex arrangements which in colloidal chemistry are referred to as micelles is given by A. W. Thomas in his book "Colloid Chemistry" published by McGraw-Hill Book Co., Inc., year 1934, chapter 7, page 141, et seq.

In view of what has been set forth in the foregoing it will be at once evident to those skilled in the art that not only the manner of preparing the nuclear composition is new, but also that the composition in itself is novel. As distinguished from those procedures of the prior art where neutralizing agents are added to precipitate orthotitanic acid from titanium tetrachloride solutions which orthotitanic acid is redissolved in hydrochloric acid solutions, no precipitation occurs whatever in the practice of the present invention. Furthermore, the manner of preparation of our nucleating compositions is not to be confused with other procedures involving only heat-treatment of a titanium solution. Similarly, it is apparent that our nucleating compositions are not obtained by re-solution of colloidal hydrous titanium oxides such as are obtained when a titanium solution is poured into hot water or a hot dilute titanium salt solution. Also, the colloidal titanium complexes formed in the present invention during the heat-treatment of our nuclear composition are not re-dissolved upon heating in the titanium salt solution to which it has been added prior to the precipitation of the raw titanic acid.

When the heat-treatment is completed as indicated by the development of the proper degree of opalescence, the nuclear composition is ready for use.

IV. MANNER OF MIXING THE HEAT-TREATED NUCLEAR COMPOSITION WITH THE HYDROLYZABLE TITANIUM SALT SOLUTION

The novel nuclear compositions of the present invention are particularly adaptable for the hydrolysis of titanium tetrachloride solutions but they may be employed as well for the hydrolysis of other hydrolyzable titanium salt solutions, for example, titanium sulfate solutions. When hydrolyzing a titanium tetrachloride solution using the nuclear compositions of the present invention the manner of mixing is not particularly important but we have found it convenient to add the nuclear composition to the titanium tetrachloride solution to be hydrolyzed. On the other hand, if the solution to be hydrolyzed is a titanium sulfate solution it may prove desirable to reverse this procedure, that is, to add the titanium salt solution to the nuclear composition. In this manner there is obtained from titanium sulfate solutions products possessing the maximum tinting strength and best color and having the crystalline characteristics of rutile titanium dioxide.

V. CONCENTRATION OF TITANIUM IN THE HYDROLYSIS MIXTURE OF NUCLEAR COMPOSITION AND TITANIUM SALT SOLUTION

In the practice of the invention the nucleating efficiency and the quality of the products obtained are influenced by the concentration of titanium in the hydrolysis mixture. By hydrolysis mixture we mean the mixture of hydrolyzable titanium salt solution and nuclear composition, since the addition of the nuclear composition to the titanium salt solution adds titanium to the mixture which is recoverable in the hydrolysis. The concentration is here expressed as concentration of titanium in the mixture of nucleating composition and hydrolyzable titanium salt solution. It has been found that the optimum results are obtained when the hydrolysis mixture contains between about 80 to about 200, preferably about 125 to about 150 grams of titanium calculated as titanium dioxide, $TiO_2$, per liter.

VI. BASICITY, I. E., RATIO OF TITANIUM TO ACID IN THE HYDROLYSIS MIXTURE OF SALT SOLUTION AND NUCLEAR COMPOSITIONS

We have found that the basicity of the hydrolyzable salt solution is not an important factor in the practice of our invention. The hydrolyzable salt solution may be normal, i. e., contain four mol equivalents of hydrochloric acid or two mol equivalents of sulfuric acid to each mol equivalent of titanium dioxide in solution. In the case of titanium tetrachloride, direct solution of commercial anhydrous titanium chloride will usually result in a slight loss of hydrochloric acid as vapor thus giving a slightly basic solution. However, whether or not such loss occurs there is no advantage gained by neutralizing these solutions chemically. On the other hand, titanium sulfate solutions, which are usually obtained by dissolution of ilmenite in sulfuric acid, obviously may be more economically obtained as basic solutions and such, therefore, would be preferred.

VII. QUANTITY OF NUCLEAR COMPOSITION AND CONCENTRATION OF TITANIUM THEREIN TO BE EMPLOYED IN THE HYDROLYSIS OF THE TITANIUM SALT SOLUTION

Both the concentration of titanium in the nuclear composition as well as the amount of nuclear composition employed in the invention appear to have a relation to nucleating efficiency and quality of products obtained.

As regards titanium concentration in the nuclear composition it has been found that best results are obtained when employing a nuclear composition containing between about 5 to about 30 grams of titanium calculated as titanium dioxide, $TiO_2$, per liter, preferably between about 10 and about 20 grams $TiO_2$ per liter. It is evident that those workers of the prior art who were seeking to prepare colloids which were very nearly of a discrete particle size, such as are obtained by the heat-treatment of basic solutions of orthotitanic acid, overlooked the possibility, which we have discovered, that titanium chloride solutions in which the titanium micelles have aggregated to a relatively low degree may have an even greater nucleating efficiency, both as to time required to complete thermal precipitation and as to quality of final product.

When employing nuclear compositions containing the preferred concentration of titanium it is preferable that the titanium added in the nuclear composition should constitute between about 1.0 per cent and about 10.0 per cent of the total titanium present in the hydrolysis mixture, preferably between about 4 per cent and about 5 per cent.

The foregoing remarks give in detail the salient features of the invention in such terms as will enable those skilled in the art to practice the invention. It will be understood that certain variables may enter into the practice of the invention, depending upon the nature of the hydrolyzable titanium salt solution, time and temperature of heating, concentration of the hydrolyzable salt solution and the nuclear composition, basicity of the hydrolyzable salt solution, etc. Thus, if a titanium sulfate solution is to be hydrolyzed using a ratio of nuclear composition of the present invention the titanium salt solution may vary somewhat as may also vary the concentration of titanium in the nuclear composition and the concentration of titanium in the hydrolysis mixture.

According to the present invention the thermal hydrolysis of the mixture of nuclear composition and hydrolyzable titanium salt solution is completed in a very much shorter time than is required in the ordinary prior art hydrolysis procedures. Thus, when practicing the present invention we have found that a hydrolysis carried out at the boiling point of the hydrolysis mixture for about 30 minutes is usually sufficient to precipitate over 97 per cent of the titanium from solution. As a matter of fact it has been found in many instances that boiling the hydrolysis mixture for only 15 minutes yields recoveries of about 97 per cent and only in rare instances is it necessary to exceed a boiling treatment for about 1 hour.

The adaptation of the invention to the hydrolysis of titanium solutions is illustrated in the following examples:

Example 1

A master solution of titanium tetrachloride was prepared by running crude commercial anhydrous titanium tetrachloride slowly into a weighed quantity of cracked ice until the weight was doubled. The temperature was held below 35° C. during the addition. Zinc was added to reduce the solution to a content of between about 1 to 3 grams per liter of reduced titanium, calculated as $TiO_2$. The solution had a specific gravity of about 1.5. A portion of the master solution containing 15 grams of $TiO_2$ was transferred to a beaker and 10.6 grams of calcium chloride in an aqueous solution, equal to one atom equivalent of chlorine per molecule of titanium tetrachloride, was added with agitation. The resulting solution was diluted to one liter and then heated to 85° C. for 10 minutes, then cooled to room temperature.

300 cc. of the master solution was placed in a precipitation flask equipped with means for agitation and a reflux condenser and 300 cc. of the nuclear composition was slowly added at room temperature. To this mixture was then added 150 cc. of water. The ratio of titanium in the nuclear composition was between about 4 to 5 parts per 100 parts of titanium in the titanium tetrachloride solution. The mixture was then heated to boiling and refluxed for one hour, after which time the yield was about 97 per cent of the titanium in solution. The precipitated hydrous titanium dioxide was washed with dilute sulphuric acid and calcined at a temperature of about 800° C. for one hour.

The pigment so obtained had a very good color and a tinting strength, as determined by the Reynolds constant volume method, of 1400. Its brightness was at least equal to that of a standard commercial titanium dioxide pigment which possesses a tinting strength of only about 1200.

Example 2

Upon repeating Example 1, using only 5.3 grams of calcium chloride equal to one-half atom equivalent of chlorine per molecule of titanium tetrachloride instead of 1 atom, a product was obtained having a tinting strength of 1450 of very good color and high brightness.

Example 3

A portion of the titanium tetrachloride master solution prepared according to Example 1 containing 15 grams titanium dioxide was transferred to a suitable vessel and to this were added 20 grams of sodium borate, $Na_2B_4O_7 \cdot 10H_2O$ (borax) as an aqueous solution with constant agitation. The ratio of monovalent anion added in this example, calculated as $BO_2^-$ per molecule of $TiCl_4$ was 1.12:1.0.

The solution was now diluted to 1000 cc. and heat-treated at 85° C. for 10 minutes to develop its nucleating power and cooled to room temperature. 300 cc. of the master solution was placed in a precipitation vessel equipped for agitation and with reflux condenser and 300 cc. of the nuclear composition slowly added thereto. 150 cc. of water was then added slowly to the mix which was brought to boiling and refluxed for about one hour. The resulting precipitated hydrous titanium dioxide was calcined at 800° C. for 3 hours. The resulting titanium dioxide posseseed a very good color and had a tinting strength value as determined by the Reynolds method of 1600. When the calcination was carried out for only 1 hour at 800° C. the product had a tinting strength of 1525.

Example 4

When following the procedure described in Example 3, but using instead of 20 grams of sodium borate 40 grams, that is, a ratio of $BO_2^-$ to $TiCl_4$ of 2.24:1.0 a product was obtained having a tinting strength of 1650.

Example 5

A master solution of titanium tetrachloride was prepared in the manner described in Example 1. It contained titanium equivalent to 340 grams per liter of $TiO_2$ and 550 grams per liter of hydrochloric acid and one gram per liter reduced titanium, calculated as $TiO_2$. 44 cc. of the above-described master solution containing 15 grams of titanium, calculated as $TiO_2$ was carefully diluted to 200 cc. with water under stirring. To the diluted 44 cc. of master solution was now added with stirring 15.6 grams sodium acetate,

$Na.OOC.CH_3 \cdot 3H_2O$ in 100 cc. of water, after which the resulting solution was diluted to 1000 cc. and heated to 85° C. in 20 minutes and held at that temperature for 10 minutes with constantly agitating. Thereafter it was cooled to room temperature. 300 cc. of the above described master solution was placed in a suitable vessel equipped with means for agitation under reflux condenser. 300 cc. of the titanium nuclear composition was slowly added after which 150 cc. of water was also added to the mixture. The mixture was heated to the boiling point in about 20 minutes and boiled for 2 hours. The precipitated hydrous titanium oxide was calcined at about 800° C. for about one hour. It had good color and a tinting strength of 1475 as determined by the Reynolds constant volume method.

Example 6

To 44 cc. of titanium tetrachloride master solution obtained according to Example 1, 15.5 grams of aluminum chloride ($AlCl_3 \cdot 6H_2O$), in the form of an aqueous solution, were added with constant stirring. The mixture was diluted to 1 liter and heated at 85° C. for 10 minutes. It was cooled and 300 cc. thereof added slowly to 300 cc. of the master solution, the whole was further diluted with 100 cc. of water and brought to a boil in about 20 minutes. It was boiled for 1 hour. The precipitated hydrous titanium oxide was calcined at 800° C. for 1 hour. The resulting titanium dioxide pigment had a very good color and a tinting strength of 1400.

*Example 7*

A nuclear composition was prepared as described in Example 1. It had a ratio of Cl- added with calcium chloride to $TiCl_4$ of 1.0:1.0.

The hydrolysis solution was a titanium sulphate solution obtained by dissolving ilmenite in sulphuric acid. It had the following composition:

Titanium (tetravalent), as $TiO_2$__Grams per liter_____ 150
$H_2SO_4$ (free and combined with Ti)__Grams per liter_____ 290
Titanium (trivalent), as $TiO_2$__Grams per liter_____ 3
Specific gravity at room temperature_____ 1.42

The solution also contained a part of the iron originally present in the ore as ferrous sulfate.

400 cc. of this titanium sulfate solution was placed in a suitable vessel equipped with means for mechanical agitation in a reflux condenser and 200 cc. of the above described titanium nucleating composition was slowly added thereto. The addition was carried out at room temperature. The mixture was heated to boiling in about 25 minutes and boiled for 2 hours. The rate of hydrolysis of the titanium sulfate solution was greatly accelerated. Upon calcination of the precipitated hydrous titanium oxide, the product obtained had properties comparable to those obtained from Examples 1–4.

The present invention does not require any material deviation from the standard calcination treatments nor any deviation from the usual treatments after calcination. Furthermore, the products of the present invention are outstanding because of their high tinting strength. They have good color, texture and other pigment properties.

We claim:

1. A method for the preparation of nuclear compositions useful in the hydrolytic precipitation of hydrous titanium oxide from titanium salt solutions which comprises heating a titanium tetrachloride solution having a titanium content, calculated as $TiO_2$, of between approximately 5 grams and approximately 30 grams per liter and containing per mol $TiCl_4$ from approximately 0.5 to approximately 2.0 mols monovalent anion equivalents added as a non oxidizing soluble, ionizable salt yielding monovalent anions until a degree of opalescence develops substantially equal to the degree of opalescence produced at the end of 10 to 15 minutes' heating at temperatures between 80° C. and 90° C. of a similar titanium tetrachloride solution, having a titanium content, calculated as $TiO_2$, of approximately 15 grams per liter and containing per mol of $TiCl_4$ from 0.5 to 2.0 mols added non-oxidizing, monovalent anions.

2. A method for the preparation of nuclear compositions useful in the hydrolytic precipitation of hydrous titanium oxide from titanium salt solutions which comprises adding to a titanium tetrachloride solution having a titanium content, calculated as $TiO_2$, of between approximately 5 grams and approximately 30 grams per liter, a sufficient amount of a non-oxidizing soluble, ionizable salt yielding monovalent anions to yield per mol of $TiCl_4$ from approximately 0.5 to approximately 2.0 mols monovalent anion equivalent and heating the mixture until a degree of opalescence develops substantially equal to the degree of opalescence produced at the end of 10 to 15 minutes' heating at temperatures between 80° C. and 90° C. of a similar titanium tetrachloride solution, having a titanium content, calculated as $TiO_2$, of approximately 15 grams per liter and containing per mol of $TiCl_4$ from 0.5 to 2.0 mols added non-oxidizing, monovalent anions.

3. A method for the preparation of nuclear compositions useful in the hydrolytic precipitation of hydrous titanium oxide from titanium salt solutions which comprises adding to a titanium tetrachloride solution having a titanium content, calculated as $TiO_2$, of between approximately 10 grams and approximately 20 grams per liter, a sufficient amount of a non-oxidizing soluble, ionizable salt yielding monovalent anions to yield per mol of $TiCl_4$ from approximately 0.5 to approximately 2.0 mols monovalent anion equivalents and heating the mixture for approximately 10 minutes to approximately 15 minutes at temperatures between approximately 80° C. and approximately 90° C.

4. A method for the preparation of nuclear compositions useful in the hydrolytic precipitation of hydrous titanium oxide from titanium salt solutions which comprises adding to a titanium tetrachloride solution having a titanium content, calculated as $TiO_2$, of between approximately 10 grams and approximately 20 grams per liter, a sufficient amount of calcium chloride to yield per mol of $TiCl_4$ from about 0.5 to approximately 2.0 mols chlorine ion equivalents and heating the mixture for approximately 10 minutes to approximately 15 minutes at temperatures between approximately 80° C. and approximately 90° C.

5. A method for the preparation of nuclear compositions useful in the hydrolytic precipitation of hydrous titanium oxide from titanium salt solutions which comprises adding to a titanium tetrachloride solution having a titanium content, calculated as $TiO_2$, of between approximately 10 grams and approximately 20 grams per liter a sufficient amount of sodium borate to yield per mol of $TiCl_4$ from approximately 0.5 to approximately 2.0 mols borate ion equivalents and heating the mixture for approximately 10 mintues to approximately 15 minutes at temperatures between approximately 80° C. and approximately 90° C.

6. A method for the preparation of nuclear compositions useful in the hydrolytic precipitation of hydrous titanium oxide from titanium salt solutions which comprises adding to a titanium tetrachloride solution having a titanium content, calculated as $TiO_2$, of between approximately 10 grams and approximately 20 grams per liter, a sufficient amount of sodium acetate to yield per mol of $TiCl_4$ from approximately 0.5 to about 2.0 mols acetate ion equivalents and heating the mixture for approximately 10 minutes to approximately 15 minutes at temperatures between approximately 80° C. and approximately 90° C.

7. In a method for the preparation of nuclear compositions useful in the hydrolytic precipitation of hydrous titanium oxide from titanium salt solutions, the step which consists in adding to a titanium tetrachloride solution having a titanium content, calculated as $TiO_2$ of between approximately 5 grams and approximately 30 grams per liter a sufficient amount of a non-oxidizing soluble ionizable salt yielding monovalent anions to yield per mol of $TiCl_4$ from approximately 0.5 to about 2.0 mols monovalent anion equivalents.

8. As a new composition of matter a slightly opalescent, titanium chloride solution containing between approximately 5 grams and approximately 30 grams titanium, calculated as $TiO_2$, per liter, substantially four mols hydrochloric acid for every mol $TiO_2$ and in addition between approximately 0.5 and approximately 2.0 mols of added non-oxidizing monovalent anions and having an opalescence substantially equal to the degree opalescence produced at the end of 10 to 15 minutes' heating at temperatures between 80° C. and 90° C. of a similar titanium tetrachloride solution, having a titanium content, calculated as $TiO_2$, of approximately 15 grams per liter and containing per mol of $TiCl_4$ from 0.5 to 2.0 mols added non-oxidizing, monovalent anions and which possesses the property of accelerating the thermal hydrolytic decomposition of titanium salt solutions.

9. As a new composition of matter a slightly opalescent, titanium chloride solution containing between approximately 10 grams and 30 grams titanium, calculated as $TiO_2$, per liter, substantially four mols hydrochloric acid for every mol $TiO_2$ and in addition between approximately 0.5 and approximately 2.0 mols of added non-oxidizing monovalent anions and having a opalescence substantially equal to the degree opalescence produced at the end of 10 to 15 minutes' heating at temperatures between 80° C. and 90° C. of a similar titanium tetrachloride solution, having a titanium content, calculated as $TiO_2$, of approximately 15 grams per liter and containing per mol of $TiCl_4$ from 0.5 to 2.0 mols added non-oxidizing, monovalent anions and which possesses the property of accelerating the thermal hydrolytic decomposition of titanium salt solutions.

10. A method for the hydrolytic precipitation of hydrous titanium oxide from titanium salt solutions which comprises admixing with a titanium salt solution a sufficient amount of a nuclear composition prepared according to the method of claim 1 so that the titanium content of the mixture, calculated as $TiO_2$, is between approximately 80 grams and approximately 200 grams per liter of which between approximately 1 per cent and approximately 10 per cent of the total titanium is derived from the nuclear composition, and heating the mixture at temperatures up to the boiling point thereof until substantially all of the titanium has been hydrolytically precipitated.

11. A method for the hydrolytic precipitation of hydrous titanium oxide from titanium salt solutions which comprises admixing with a titanium salt solution a sufficient amount of a nuclear composition prepared according to the method of claim 3 so that the titanium content of the mixture, calculated as $TiO_2$, is between approximately 125 grams and approximately 150 grams per liter of which between approximately 4 per cent and approximately 5½ per cent of the total titanium is derived from the nuclear composition, and heating the mixture at temperatures up to the boiling point thereof until substantially all of the titanium has been hydrolytically precipitated.

12. A method for the hydrolytic precipitation of hydrous titanium oxide from titanium salt solutions which comprises admixing with a titanium chloride solution a sufficient amount of a nuclear composition prepared according to the method of claim 1 so that the titanium content of the mixture, calculated as $TiO_2$, is between approximately 80 grams and approximately 200 grams per liter of which between approximately 1 per cent and approximately 10 per cent of the total titanium is derived from the nuclear composition, and heating the mixture at temperatures up to the boiling point thereof until substantially all of the titanium has been hydrolytically precipitated.

JELKS BARKSDALE.
WALTER W. PLECHNER.